July 21, 1953 J. W. LENDVED ET AL 2,645,947
MOTOR CONTROL MECHANISM FOR CONCRETE MIXER POWER PLANTS
Filed Sept. 5, 1951 3 Sheets-Sheet 1

INVENTORS
John W. Lendved and
Edwin A. C. Eickstaedt,
BY
ATTORNEY

July 21, 1953    J. W. LENDVED ET AL    2,645,947
MOTOR CONTROL MECHANISM FOR CONCRETE MIXER POWER PLANTS
Filed Sept. 5, 1951    3 Sheets-Sheet 2
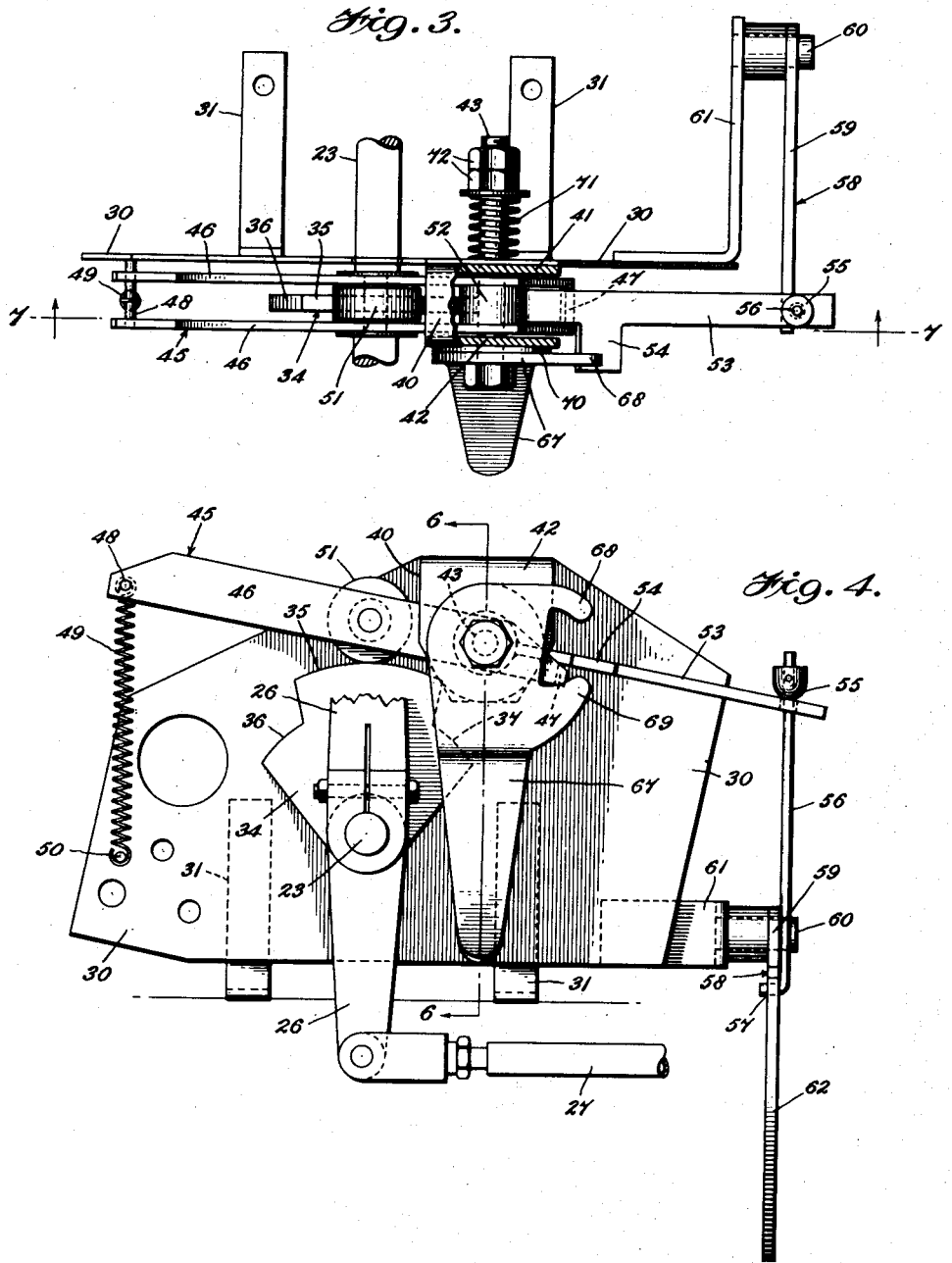
INVENTORS
John W. Lendved and
Edwin A. C. Eickstaedt,
BY
ATTORNEY July 21, 1953   J. W. LENDVED ET AL   2,645,947
MOTOR CONTROL MECHANISM FOR CONCRETE MIXER POWER PLANTS
Filed Sept. 5, 1951   3 Sheets-Sheet 3
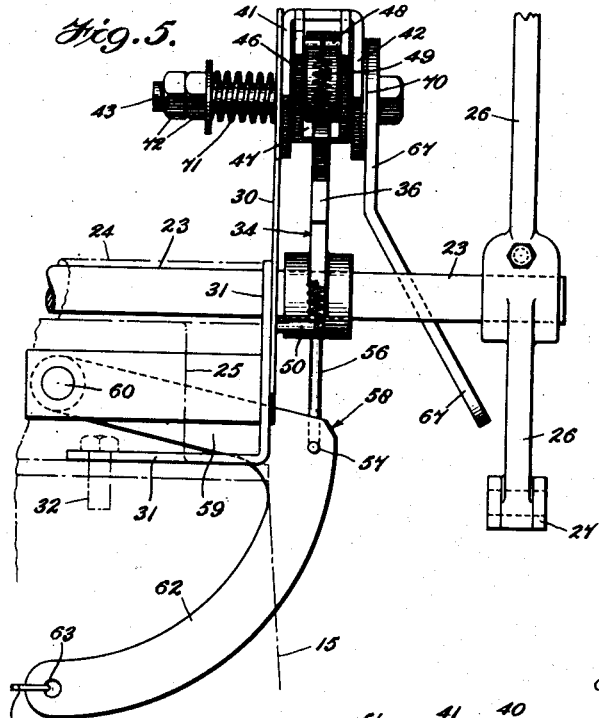
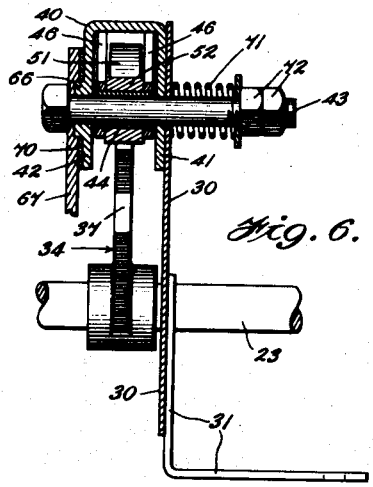
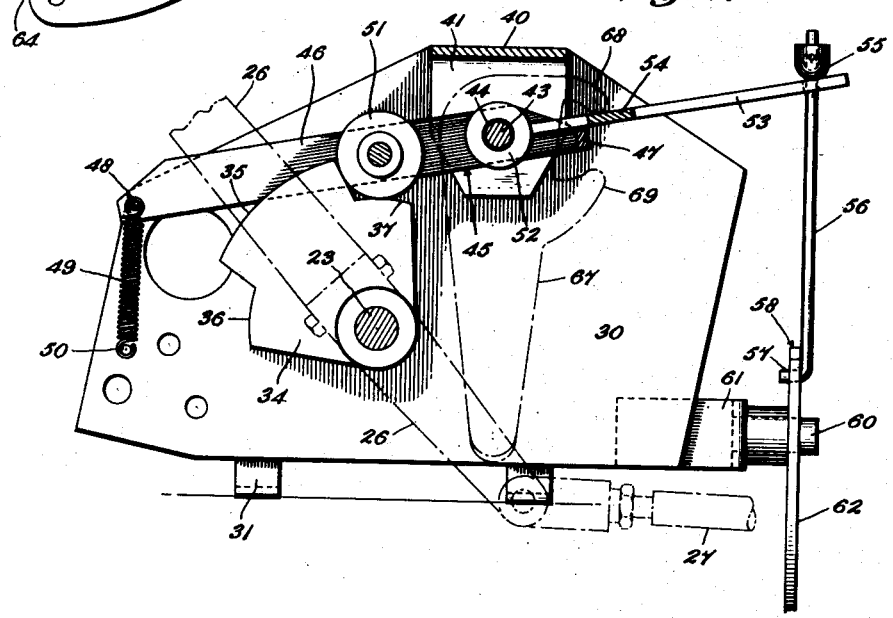
INVENTORS
John W. Lendved and
Edwin A. C. Eickstaedt,
BY
ATTORNEY Patented July 21, 1953

2,645,947

UNITED STATES PATENT OFFICE 2,645,947

MOTOR CONTROL MECHANISM FOR CONCRETE MIXER POWER PLANTS

John W. Lendved and Edwin A. C. Eickstaedt, Milwaukee, Wis., assignors to Chain Belt Company, Milwaukee, Wis., a corporation of Wisconsin Application September 5, 1951, Serial No. 245,218

4 Claims. (Cl. 74—472)

1

This invention relates to power plants such as are now widely employed for driving the reversible drums of truck-mounted concrete mixers and agitators, and has for its principal object the provision of an improved mechanism for controlling the motors of such plants whereby the starting, stopping and reversing of the drums may be effected with greater facility and less strain upon and likelihood of damage to the power transmissions.

As is now well known, mixers of this type comprise a unit designed and constructed for mounting upon any standard motor truck chassis, said unit including a drum having a capacity of up to ten cubic yards of concrete, which drum is mounted for rotation about a longitudinal axis which may be disposed either horizontally or at a rearward upward inclination to the horizontal. Mixing of the raw materials in the drum, and discharge of the mixture through an opening at the rear end thereof, are effected by means of appropriately disposed blades secured to the inner face of the drum walls, the mixing usually taking place during rotation of the drum in one direction while discharge occurs upon reversal of such rotation.

Sometimes, if the truck motor is sufficiently powerful, the drums are driven through the medium of a power take-off from such motor, but more frequently the mixing or agitating units are equipped by their manufacturer with a separate power plant comprising an internal combustion engine and a speed reducing and reversing mechanism for transmitting power from such engine to the drum. A typical example of such a transmission is to be found in prior U. S. Patent No. 2,243,035 granted May 20, 1941, on an application filed by Louis G. Hilkemeier, which mechanism briefly comprises a pair of gears driven in opposite directions by the engine, and a friction clutch associated with each of said gears whereby it may be coupled to a shaft carrying the pinion of a speed reducing gear train the larger gear of which is carried by an output shaft that is connected to the drum by a chain drive. The clutches are alternatively engageable by manually operable clutch-shifting means, which also controls a brake on the pinion shaft, applying such brake when both clutches are disengaged and releasing it when either clutch is engaged.

The power plant ordinarily is disposed forwardly of the drum, adjacent the truck cab when the unit is mounted, and in addition to the manually operable lever for controlling the transmission clutches and brake, it is customary to also provide at this point another manually operable lever or member, connected to the throttle valve of the engine whereby the speed of the latter may be varied from idling to full at will. However, since many of the duties of the operator, particularly during discharge of the mixture from the drum, require his presence at the rear end of the machine, it is further customary to provide a second set of control levers at this point, which are connected by suitable linkage with the forward clutch and throttle control elements so that the necessary controls may be effected from either station.

A cubic yard of concrete weight about two tons and obviously the reversal of a drum containing from five to ten tons of material requires a certain amount of care if undue strains upon and possible damage to the transmission gearing, clutches and/or motor are to be avoided. With a machine constructed as above described, this may be accomplished in either of two ways. First, the operator may manipulate the throttle control at either station to bring the engine down to idling speed (at which the drum is rotating at about 4 or 5 revolutions per minute), then shift the transmission control from say forward to neutral and after pausing there to permit the brake to bring the transmission and drum to a stop, continue movement of the control lever to the reverse position, after which he again manipulates the throttle control lever to return the engine to working speed. Obviously, this requires two separate movements of each control lever. Second, without reducing the engine speed, he may shift the transmission control lever from say forward to neutral, pause there until drum rotation stops, and then continue to the reverse position. Because of the higher drum speeds, the pause in neutral should be longer than in the first described mode of operation, and the second mode is further objectionable in that the brake must perform more work in bringing the faster moving drum to a stop, and the clutches must perform more work in picking up the load at the higher engine speed, although in recent years this objection has been at least in part overcome through the interposition of a fluid coupling between the engine and the transmission gear mechanism.

While a careful operator may effect reversals of the drum in either of the manners indicated without undue risk, an inexperienced or careless one may seek to reverse the drum without reducing the engine speed and without holding the transmission control lever in neutral for a time sufficient to permit the drum to come to a complete stop. This may result in substantial damage to the machine, and it is one of the prime objects of this invention to provide an automatically functioning device which will prevent such detrimental mode of operation.

To this end, while the above described reduction gear and reversing mechanism, and its forward and rearward control levers are retained, the usual throttle control levers at the forward and rearward stations are omitted and in lieu thereof there is provided a throttle control mechanism, conveniently mounted upon the reduction gear casing and arranged to be actuated by said transmission controls whereby as the latter are shifted from either operating position toward neutral the engine throttle valve will be closed and the engine slowed to idling speed, and conversely, as the transmission controls are moved from neutral and reach either operating position, the throttle will be automatically opened and the engine restored to working speed. The device also includes adjustable means whereby the idling and working speeds of the engine may be varied if desirable, and also whereby the throttle may be manually opened and closed when the transmission is in neutral, if for any reason that should become necessary.

One form of the invention has been illustrated in the accompanying drawings constituting a part of this specification, in which like reference characters designate like parts in all the views and wherein:

Fig. 3 is a still further enlarged plan view of the present mechanism, partly broken away;

Fig. 4 is a front elevational view of the device as shown in Fig. 3, the parts being illustrated in the positions they occupy when the transmission control is in neutral;

Fig. 5 is a side elevational view of the device, as seen from the left of Fig. 4;

Fig. 6 is a transverse vertical sectional view taken approximately on the plane indicated by the line 6—6 in Fig. 4, looking in the direction of the arrows; and Fig. 7 is a sectional-elevational view on approximately the plane indicated by the line 7—7 in Fig. 3, and showing the parts in the positions assumed when the transmission control is shifted to one of the operating positions.

Figure 1:
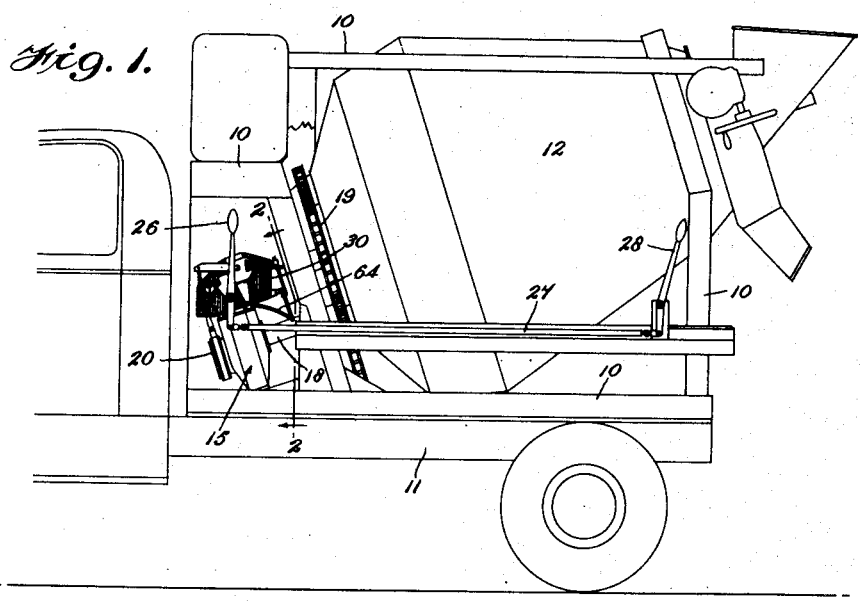
Figure 1 is a side elevational view of a well known example of inclined-axis truck-mounted concrete mixing unit, illustrating the application thereto of a throttle control mechanism constructed and arranged in accordance with the invention.
Figure 2:
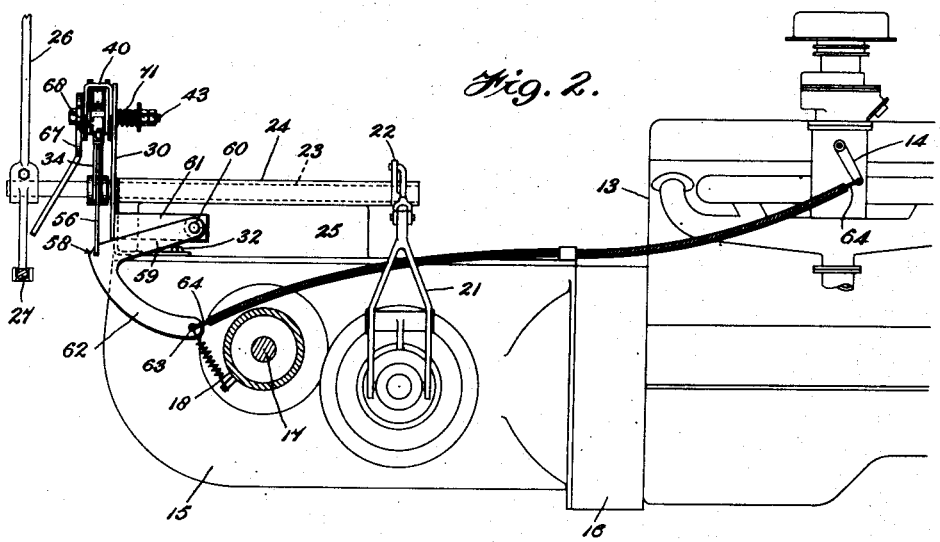
Fig. 2 is a transverse view on a somewhat larger scale, taken approximately on the plane indicated by the line 2—2 in Fig. 1, looking in the direction of the arrows, and showing the essential elements of the power plant of the mixing unit, the mounting of the present device upon the gear casing thereof, and the connections between the control mechanism and the throttle valve arm of the engine.

Referring more particularly to Figs. 1 and 2 of said drawings, the concrete mixing or agitating unit there shown comprises a framework 10 secured upon the chassis 11 of a motor truck and mounting the drum 12 for rotation about an upwardly rearwardly inclined longitudinal axis. The power plant for driving the said drum is disposed transversely of the framework, in front of the drum, and as best shown in Fig. 2, comprises an engine 13 provided with the usual throttle valve operable by an arm 14, and a reduction gear and reversing mechanism 15, the input shaft of which is coupled to the crankshaft of said engine through a friction clutch or a fluid coupling enclosed within the housing 16. The mechanism 15 is here shown as of the type disclosed in the said prior U. S. Patent No. 2,243,035, and includes an output shaft 17 extending rearwardly through a tubular housing 18 and arranged to drive the drum 12 through the medium of a chain drive 19. The said mechanism 15 also includes a brake 20 and a clutch-shifting fork 21, both of which are connected by appropriate linkage to an arm 22 carried by a rock-shaft 23 which is journaled in a bearing sleeve 24 mounted on the cover member 25 of the transmission mechanism 15. The outward end of the rock-shaft 23 carries a control lever 26 which is connected by linkage 27 to a similar lever 28 disposed adjacent the rearward end of the frame 10, as shown in Fig. 1.

The control device of the present invention, as shown in detail in Figs. 3-7, comprises a vertical back-plate 30 adapted to be disposed adjacent the outward end of the transmission mechanism 15 and provided with a pair of angle brackets 31 whereby it may be secured to the top of such mechanism by bolts 32. The said back-plate is provided with an aperture through which the rock-shaft 23 may freely project, and a cam 34 is rigidly mounted on such shaft adjacent the forward face of the plate, said cam having a high portion 35 flanked on either side by lower portions 36 and 37, as will be readily understood from Figs. 4 and 7.

Rigidly secured to the upper central portion of the plate 30 is an inverted U-shaped bracket 40, the spaced legs 41 and 42 of which mount a horizontal stud 43 upon which is journaled a bushing 44 rigidly carried by a follower-lever structure 45 comprising parallel spaced arms 46 connected at one end by a cross-bar 47 and at the other end by a pin 48 to which is attached one end of a tension spring 49, the other end of which is anchored to the plate 30 by a pin 50. Intermediate the stud 43 and the pin 48 the lever structure 45 rotatably mounts a follower roll 51, which is yieldably maintained in engagement with the cam 34 by the spring 49.

The hub 52 of an arm 53 is journaled on the bushing 44 of the lever structure 45, said arm overlying and engaging with the cross-bar 47 of said structure, and being provided with a lateral lug 54. The free end of said arm has a universal connection 55 with the upper end of a link 56, the lower end of which is pivotally connected at 57 to a two-armed lever 58. One arm 59 of this lever is journaled on a stud 60 carried by a bracket 61 mounted on the back-plate 30, while the other arm 62 of said lever is connected as at 63 to one end of a Bowden wire or similar motion transmitting element 64, the other end of which is connected to the throttle valve arm 14 of the engine 13, see Fig. 2.

The leg 42 of the bracket 40 is provided with a hub 66 (see Fig. 6) surrounding the stud 43, on which hub is journaled a control lever 67 which, as best shown in Fig. 4, has a pair of vertically spaced fingers or projections 68 and 69 disposed respectively above and below the lug 54 of the arm 53. The outer face of the control lever 67 is engaged by the head of the stud 43 and a friction washer 70 is interposed between the inner face of said lever and the outward face of the bracket leg 42. These parts are maintained in adjustable frictional engagement by a compression spring 71 surrounding the stud 43 rearwardly of the plate 30, the force exerted by said spring being variable as necessary or desirable by means of the lock nuts 72 threaded upon the stud.

While the control device has been shown in Fig. 1 as applied to an inclined-axis mixing unit, it is equally applicable to units of the horizontal-axis type and for convenience it has been shown in the detail views (Figs. 3-7) in the position it would occupy on such a mixer.

The operation of the device is as follows:

When the various parts are in the positions illustrated in Figs. 1-6 inclusive, the reversing mechanism 15 is in neutral and no motion is being transmitted to the drum 12. As will be clear from Fig. 4, in this position the cam follower 51 is riding on the high portion 35 of cam 34, thereby disposing the lever structure 45 and arm 53 substantially as shown, and through link 56, lever 58, connections 64 and throttle arm 14, closing the throttle valve of the engine to idling position. However, if the transmission control lever 26 of the mixer unit be moved counterclockwise to the position indicated in broken lines in Fig. 7, whereby to release the brake 20 and engage one of the transmission clutches, its movement of the rock-shaft 23 will move the cam 34 in like direction and the follower roll 51 will descend to the lower portion 37 of the cam under the action of the spring 49. This motion of the follower and its lever structure 45 will be transmitted through the cross-bar 47 of the latter to the arm 53 and thence through the link 56, lever 58 and flexible transmitter 64 to the engine throttle valve and bring the engine up to working speed. Of course, movement of the control lever 26 in a clockwise direction to a correspondingly oppositely inclined position will have the same effect except that the other transmission clutch will be engaged, and the follower 51 will descend to the low portion 36 of the cam 34; and movement of said control lever from either of its operating positions back to the neutral position of Fig. 4 will automatically effect a reduction of the engine speed, disengagement of the transmission clutch, and re-application of the brake 20.

The cam 34 is preferably so designed that as the control lever 26 is moved to either of its operating positions, engagement of the transmission clutch effected thereby is substantially complete before the throttle is opened to raise the engine speed; and conversely, when the control lever is returned to neutral the throttle will be closed and the engine slowed down, or in the process thereof, before the clutch is disengaged and the brake applied. Thus, the strains and wear upon the clutch and brake elements will be reduced, and the time necessary to effect proper reversal of the drum minimized.

It will be apparent that only simple movements of either of the transmission control levers 26 and 28 are required and no manual actuation of separate throttle control levers is necessary as heretofore. However, the controlt lever 67 provides for manual control of the throttle in case of emergency, and also for varying the precise idling and working speeds of the engine if desirable.

As is well known, the idling speed of the engine ordinarily is determined by an adjustable stop associated with the carbureter, which limits the closing movements of the throttle valve, and when the control lever 67 of the present apparatus is in its normal position shown in Fig. 4, such conventional stop is effective since when the follower 51 is on the high portion 35 of the cam 34, the lug 54 of arm 53 does not quite contact the abutment or finger 69 of said control lever. However, if the lever 67 be shifted counterclockwise slightly, the finger 69 may be caused to engage the lug 54 and raise the arm 53 sufficiently to open the throttle a little, thus increasing the idling speed of the engine over that permitted by the conventional carbureter stop. The friction devices 70 and 71 associated with the lever 67 will maintain such lever in any position to which it may be moved, and if such increased idling speed is desired for a continued period the said lever will be left in its adjusted position.

It is sometimes desirable to lower the working speed of the engine, in which case the control lever 67 will be adjusted clockwise from the Fig. 4 position, thus lowering the finger or abutment 68 so that it will be engaged by the lug 54 before the arm 53 has been fully raised and thereby prevent full opening of the engine throttle. In this case the follower roll 51 may not descend into full engagement with the low portions 36 and 37 of cam 34, it being understood that the spring 49 is not sufficiently strong to overcome the frictional resistance to movement of the control lever 67 provided by the members 70 and 71 associated with such lever.

Obviously, a counterclockwise movement of the lever 67 greater than that above mentioned for increasing the idling speed may be employed to manually bring the engine speed up to or approaching the working speed thereof, if that should be necessary or desirable.

It will thus be seen that while in normal operation of the present automatic control mechanism the lever 67 will be set in substantially the position shown in Fig. 4, should occasion arise the said lever may be set to either increase the idling speed or reduce the working speed of the engine, or may be manipulated to bring the engine up to working speed and back to idling speed independently of the automatic control.

What is claimed is:

1. A motor control apparatus for power plants of the type comprising a motor having a speed controlling device, a reversible power transmission mechanism driven by said motor, and manually operable means controlling said transmission, said motor control apparatus comprising a supporting member; a cam follower journaled on said member; motion transmitting linkage connectible to the speed controlling device of the motor and including an arm engaging and operable by said follower; a cam engaging the follower and operable by said transmission control means, said cam having sequentially functioning portions effective through the follower and linkage to cause the speed controlling device to reduce the motor from working to idling speed during reversal of the transmission mechanism and to restore the motor to working speed upon completion of such reversal; and a manually adjustable lever journaled on said supporting member and having spaced projections alternatively engageable by said arm, whereby to vary the range of motion thereof and change the idling and working speeds of the motor.

2. A motor control apparatus for power plants of the type comprising a motor having a speed controlling device, a reversible power transmission mechanism driven by said motor, and manually operable means controlling said mechanism, said motor control apparatus comprising a supporting member; a cam follower journaled on said member; motion transmitting linkage connectible to the speed controlling device of the motor and including an arm engaging and operable by said follower; a cam engaging the follower and operable by said transmission control means, said cam having sequentially functioning portions effective through the follower and linkage to cause the speed controlling device to reduce the motor from working to idling speed during reversal of the transmission mechanism and to restore the motor to working speed upon completion of such reversal; a manually adjustable lever journaled on said supporting member and having spaced projections engageable by said arm whereby to vary the range of motion thereof and change the idling and working speeds of the motor; and adjustable tension means engaging said lever and frictionally retaining it in any position to which it may be adjusted.

3. In driving apparatus for actuating an element such as a rotary drum of a concrete mixer or the like, a power transmission mechanism including a disengageable transmission train selectively engageable to effect rotation of said element in the one or the other direction alternatively; a control member movable in either direction from a neutral position and operatively connected to effect corresponding engagement of said transmission train; a driving motor connected to drive said transmission mechanism, said motor having a speed controlling device; a speed controlling interlock mechanism operating in synchronism with said transmission control member and connected to operate said speed controlling device in a manner to reduce the speed of said motor to idling speed when said transmission is disengaged; and an overriding manual control lever presenting an actuating abutment disposed to engage said interlock mechanism when said lever is moved in one direction and operative to actuate it in a manner to increase the idling speed of said motor, and another actuating abutment disposed to engage said interlock mechanism when said lever is moved in the other direction and operative to actuate it in a manner to reduce the working speed of said motor.

4. In apparatus for driving a rotatably mounted element in forward and reverse directions at will, a motor having a speed regulating device normally maintaining it at an idling speed; a power transmission mechanism driven by said motor and having forward, neutral and reverse drive positions; volitionally operable control means for shifting said transmission mechanism between its several positions; connections between said control means and speed regulating device for actuating the latter in synchronism with the former to accelerate the motor to working speed when the transmission mechanism is shifted from its neutral position to either its forward or its reverse drive position, and to decelerate the motor to idling speed when said mechanism is returned to neutral; and means for varying the idling and working speeds of the motor at will, comprising a manually adjustable lever having a pair of abutments disposed adjacent said actuating connections of the speed regulating device, one of said abutments, in one adjustment of the lever, being engageable with a portion of said connections to a restrict motor-decelerating movements thereof whereby to increase the idling speed, and the other of said abutments, in another setting of the lever, being engageable by said portion of the connections to restrict motor-accelerating movements thereof whereby to decrease the working speed.

JOHN W. LENDVED.
EDWIN A. C. EICKSTAEDT.

References Cited in the file of this patent
UNITED STATES PATENTS

| Number | Name | Date |
|---|---|---|
| 2,284,250 | Ball et al. | May 26, 1942 |
| 2,321,098 | Morse | June 8, 1943 |
| 2,530,205 | Morse | Nov. 14, 1950 |